US007242725B2

United States Patent
Matsumoto et al.

(10) Patent No.: US 7,242,725 B2
(45) Date of Patent: Jul. 10, 2007

(54) ADAPTIVE BROADBAND POST-DISTORTION RECEIVER FOR DIGITAL RADIO COMMUNICATION SYSTEM

(75) Inventors: Frank S. Matsumoto, San Ramon, CA (US); David C. M. Pham, Fremont, CA (US)

(73) Assignee: Harris Stratex Networks Operating Corporation, Morrisville, NC (US)

( * ) Notice: Subject to any disclaimer, the term of this patent is extended or adjusted under 35 U.S.C. 154(b) by 834 days.

(21) Appl. No.: 10/406,929

(22) Filed: Apr. 2, 2003

(65) Prior Publication Data

US 2004/0196921 A1   Oct. 7, 2004

(51) Int. Cl.
*H04B 15/00*   (2006.01)
(52) U.S. Cl. .................. 375/285; 375/254; 375/278; 375/284; 375/296; 375/346
(58) Field of Classification Search ................ 375/346, 375/296, 284, 278, 227, 254, 316, 348, 285
See application file for complete search history.

(56) References Cited

U.S. PATENT DOCUMENTS

| 4,291,277 | A |   | 9/1981  | Davis et al.   |         |
|-----------|---|---|---------|----------------|---------|
| 4,481,645 | A |   | 11/1984 | Karabinis      |         |
| 4,752,743 | A |   | 6/1988  | Pham et al.    |         |
| 5,148,448 | A |   | 9/1992  | Karam et al.   |         |
| 5,193,224 | A |   | 3/1993  | McNicol et al. |         |
| 5,237,588 | A | * | 8/1993  | Tanaka et al.  | 375/230 |
| 5,285,473 | A | * | 2/1994  | Conti et al.   | 375/230 |
| 5,489,875 | A |   | 2/1996  | Cavers         |         |
| 6,456,160 | B1|   | 9/2002  | Nakayama et al.|         |
| 7,027,500 | B1| * | 4/2006  | Casas et al.   | 375/232 |

OTHER PUBLICATIONS

Johnson, "Residual BER Prediction", Agilent Technologies, Jun. 27, 2001.*
Takeshita et al., "On the Frame-Error Rate of Concatenated Turbo Codes", IEEE Trans. on Comm., vol. 49, No. 4, Apr. 2001.*
Boccuzzi et al., "Testing the double low-IF receiver architecture", Personal, Indoor and Mobile Radio Communications, 1998. The Ninth IEEE International Symposium on vol. 1, Sep. 8-11, 1998 pp. 370-374 vol. 1, Digital Object Identifier 10.1109/PIMRC.1998. 733580.*

(Continued)

*Primary Examiner*—Dac Ha
*Assistant Examiner*—Ted M. Wang
(74) *Attorney, Agent, or Firm*—Leah Sherry; Thelen Reid Brown Raysman & Steiner LLP (57) ABSTRACT

An adaptive broadband post-distortion receiver for wireless digital communications improves performance of a wireless digital communications system. The improved performance of the system includes improved linear AM-AM and AM-PM responses approaching saturation. Indeed, the proposed adaptive broadband post-distortion receiver has an effect on attributes such as bit error rate and transmitter power efficiency and, in turn, on modulation and bandwidth. The adaptive broadband post-distortion receiver is configured with an adaptively controlled IF post-distorter located at the IF stage of the receiver. The placement of the distortion canceling function in the IF section of the receiver lends itself to broadband applications. The post-distorter is configured to cancels the distortion produced by the transmitter and receiver as it is adaptively controlled using bit error rate calculations. The distortion canceling utilizes bit error rate information that is otherwise available in the receiver.

27 Claims, 6 Drawing Sheets

Radio System Block Diagram

OTHER PUBLICATIONS

J.P. Moffatt and J.P. MacEachem, "An Adaptive Qam Linearizer Using Data Postdistortion", Mar. 1989, pp. CH2682-3/89/0000-0406-0412, AT&T Bell Labs.

H. Sari and G. Karam, "Cancellation of Power Amplifier Nonlinearities in Digital Radio Receivers", 1987, ICC-87, vol. 3, pp. 1809-1814.

David Newkirk, WJIZ, "Transistor Modeling, Part 3: Constraints in Optimization, Two-Port Data with Noise Parameters, and Introducing ARRL Radio Designer 1.5!", Sep. 1995, QST pp. 99-101.

Pieter L.D. Abrie, Ampsa (PTY) Ltd., "The Multimatch Design Philosophy", Jan. 31, 2000, pp. 1-14.

APLAC Reference Manual vol. 1, "Optimization", www.aplac.hut.fi/publications/ct-7/optif.ps.

Stephen Bruss, "RF Power Amplifier Linearization Methods Overview", Dec. 17, 2000, pp. 1-12, www.ece.ucdavis.edu/-spbruss/research.

Mike Faulkner, "Architectures and Signal Processing for Radio Transceivers", Jul. 2002, pp. 1-22, IEEE SP Soc meeting, Vic., Australia.

* cited by examiner

Figure 1 - Typical Radio System Block Diagram
(Prior Art)

Figure 2 – Radio System Block Diagram

Figure 3 – Block Diagram of IF Postdistorter

Figure 4 – Block Diagram of Cuber Generator

Figure 5 - Block Diagram of Squarer Generator

Figure 6 - Block Diagram of Vector Modulator

Figure 6A - Optimization and Monitoring Routine for Adaptive Post-Distorter

Figure 7 - Summing Vector Diagram of Vector Modulator

ADAPTIVE BROADBAND POST-DISTORTION RECEIVER FOR DIGITAL RADIO COMMUNICATION SYSTEM

BACKGROUND

1. Field of the Invention

The present invention relates to digital communication systems and, specifically, to wireless digital communication systems designed for improved performance such as power efficiency and bit error rate.

2. Background Overview

Wireless systems include satellite, cellular, fixed access, wireless LANs (local area networks) and personal AN (area networks). The trend in wireless systems involves integration of the various networks, increased data rates, and proliferation of services such as Internet, data and image transmission or downloads, and voice over IP (Internet Protocol). Thus, to accommodate this trend performance attributes accounted for in wireless communications systems include sensitivity, selectivity, dynamic range, data rate capacity, power efficiency, and bit error rates. In addition, manufacturing and marketing attributes such as low cost, high reliability, and flexibility are becoming increasingly important.

Figure 1:
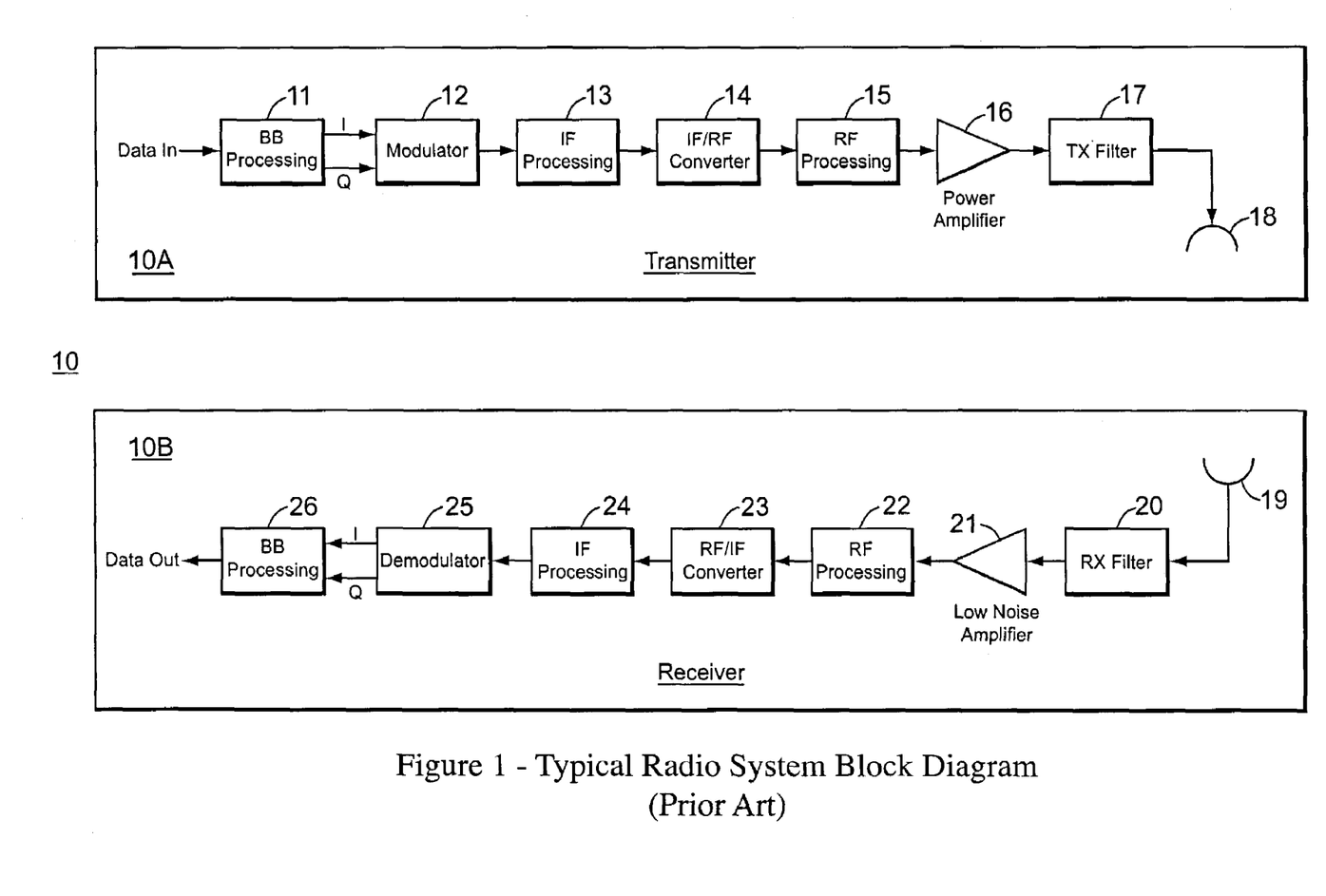
FIG. 1 illustrates transmitter and receiver components in a typical digital wireless communication system.

Digital wireless communication systems include a transmitter, a receiver (including a software-defined radio) or both (a combination that is referred to as "transceiver"). The block diagram of FIG. 1, shows typical transmitter and receiver components in a digital wireless communication system 10. In such a system there are a number of possible locations where distortion is a factor, including the baseband stage 11 & 12 (with digital data or low frequency such as <30 MHz), intermediate frequency stage 13 & 14 (IF, such as 2 GHz), and radio frequency stage 15, 16 & 17 (RF, such as 6 GHz) including mmW (millimeter wave frequencies, such as 38 GHz).

In digital communication systems, the enabling technology is a combination of software control, RF and IF circuitry, and digital circuitry, including signal-processing components. The design of digital communication systems presents a challenge of optimizing the RF circuit functionality to address one or more of the foregoing performance, manufacturing, and marketing attributes and the complexities they introduce.

For example, in the transmitter, the RF power amplifier is expected to meet peak and average power specifications and provide high power efficiency within the specified frequency range. However, distortion in amplifiers generates AM—AM and AM–PM non-linearities (AM stands for amplitude modulation, PM stands for phase modulation). Hence, communication systems using linear modulation techniques such as quadrature amplitude modulation (QAM) are restricted by the performance of the transmitter and receiver. One of the restrictions is the aforementioned non-linear characteristic of the power amplifier that causes the AM—AM and AM–PM distortion.

There are a number of approaches for controlling linearity and distortion levels. The simplest approach involves using higher power devices in the power amplifier while operating at a high back-off ratio in the output power level. The drawbacks of this approach include increased DC power consumption, higher cost, and lower reliability.

A common approach for improving power amplifier linearity is to use RF signal feedback. In a higher frequency range, the tradeoff for improved linearity is reduced gain and, in turn, reduced power level. In transmitters, the reduction in output power level has an adverse effect on the allowable distance between the transmitters and corresponding receivers.

Baseband signal feedback—which is analogous to pre-distortion of power amplifier input—is used in transmitters to provide for some of the deficiencies of RF signal feedback. This approach involves baseband signal modulation of an RF carrier, and amplification of the modulated RF carrier signal by the non-linear RF power amplifier. A sample of the amplified, modulated carrier signal is demodulated and fed back to the input of a baseband amplifier where it is combined with the basedband input of that amplifier. The introduction of the demodulated sampled carrier signal at the input of the baseband amplifier creates a pre-distortion of the baseband signal to counteract the distortion from the RF power amplifier's non-linearity. The tradeoff in this case is a feedback loop delay that limits the possible bandwidth of transmitted signals.

RF signal pre-distortion is another approach. The objective in this approach is to directly cancel the distortion of the power amplifier by pre-distorting the signal going into it. As in the case of the baseband pre-distortion scheme, the RF signal pre-distortion can be adaptive using a cancellation scheme based on the transmitter signal.

Namely, some transmitters use a cancellation scheme as a variation of the pre-distortion approach. This involves adaptive feedback where the gain of cancellation amplifiers is adaptively modified. Adaptive control methods are used to adjust a distortion canceling circuitry for changing conditions such as transmitter power levels, temperature, or aging. Examples of methods for adaptive control include conversion to baseband, conversion to IF, and predictive calibration.

In the conversion to baseband scheme, a simplified receiver (located in the transmitter) is used to sample the modulated transmit signal. The distortion canceling circuit is adjusted based on the demodulated baseband signal. The gain adjustment combined with the pre-distortion reduces amplitude and phase distortions. However, this approach assumes that the distortion is a relatively small component of the signal. Moreover, frequency changes would negate the corrective effects of the cancellation scheme.

In the conversion to IF scheme, the modulated output signal (usually from the transmitter power amplifier) is down converted to an IF signal. The modulated IF signal is filtered to monitor the amount of distortion. Then a distortion canceling circuit is adjusted to minimize the distortion. This approach suffers from deficiencies similar to those outlined above.

With predictive calibration, the transmitter uses a look-up table based on temperature and transmitter power level to adjust the distortion canceling circuit. This is not a true adaptive method, but an open loop technique requiring careful characterization of the transmitter.

Over time, numerous combinations of distortion canceling and adaptive control methods have been broached. Commonly, these techniques have been employed in the transmitter sections of wireless digital communications systems.

However, given that distortion remains a factor in digital transmission, design considerations of dynamic range, bit error rate, power efficiency, data rate capacity and the like also remain. Accordingly, in dealing with the associated design challenges a better approach is needed.

SUMMARY OF THE INVENTION

The present invention provides an adaptive broadband post-distortion receiver for wireless communications. This approach improves the performance of a wireless digital communications system with a combination transmitter and receiver by improving linear AM—AM and AM–PM responses approaching saturation. Indeed, the proposed adaptive broadband post-distortion receiver has an effect on attributes such as bit error rate and transmitter power efficiency and, in turn, on modulation and bandwidth. In this receiver, an adaptively controlled IF post-distorter compensates for the non-linear distortion in both transmitter and receiver sections of a wireless digital communication system. The IF post-distorter is configured to cancels the distortion produced by the transmitter and receiver by being adaptively controlled via performance monitoring with bit error rate calculations or signal-to-noise ratios. This approach avoids introducing limitations into and allows maintaining the transmitter spectrum response. Moreover, the IF post-distorter is adjustable to fit a variety of transmitters and receivers.

In fashioning the adaptively controlled IF post-distorter, a distortion canceling circuit is employed in the IF section of the broadband receiver. The distortion canceling circuit utilizes bit error rate information that is inherently available in the receiver. The bit error rate information is derived from available communication system performance values without requiring additional circuitry. The bit error rate information is easily retrievable from the receiver for processing by a microprocessor, and it is used to adaptively adjust the distortion canceling circuit for improved performance.

The placement of the distortion canceling circuit in the IF section of the receiver lends itself to broadband applications. The RF transmit and receive frequencies of the wireless communication system can be changed independently of the IF frequency. Thus, a single design is suitable for work at various RF frequencies, including frequencies from 2 GHz to greater than 40 GHz.

It is further envisioned that the IF post-distorter will be capable of independently adapting to the non-linear characteristics of various power amplifiers or receivers. The non-linear characteristics of the power amplifiers or receivers do not need to be known in advance of the cancellation process.

To recap, in accordance with a purpose of the invention a receiver system for distortion compensation is envisioned to include an IF post-distorter in the IF section of the receiver, a bit error rate source, and a controller. The controller is configured to obtain residual bit error rate (RBER) from the bit error rate source, and to use the RBER in performing an optimization process for adjusting the post-distorter to reduce the RBER. The controller is fashioned as a digital circuit including a microprocessor. In such a system, the post-distorter includes a power splitter, a delay line setting one path from the power splitter, a cuber generator setting a second path from the power splitter, a vector modulator connected to the cuber generator along the second path, and a power combiner at which the first and second paths are joined. The receiver in which such system is embodied is communicatively connected to a transmitter via an antenna. Hence, the post-distorter is envisioned to affect reduction in the RBER regardless of variations in transmitter power levels, or temperature and aging of the transmitter and receiver.

In further accordance with a purpose of the invention a method for adaptive broadband post-distortion is performed in a receiver system such as the foregoing. Generally, a method for adaptive broadband post-distortion includes receiving an RF signal from a transmitter, down converting the RF signal into an IF signal, and processing the IF signal. As implemented in one instance, the method further includes introducing post-distortion into the processed IF signal, demodulating the post-distorted, processed IF signal to create a baseband signal, processing the baseband signal, retrieving a bit error rate associated with the processed baseband signal, and performing an optimization process according to which the post-distortion is adjusted. In this instance, the optimization process is a random or gradient optimization process.

Advantages of the invention can be understood by those skilled in the art, in part, from the description that follows. Advantages of the invention can be realized and attained from practice of the invention disclosed herein.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE INVENTION

The present invention is based, in part, on the observation that post-distortion techniques have not been a factor considered in the design of receivers in digital communication systems. To achieve improved performance, the present invention introduces post-distortion techniques into the design of broadband receivers, as compared with the various pre-distortion techniques used in transmitters. As a functional and architectural strategy, the invention contemplates an adaptive broadband post-distortion receiver for wireless communications which has an adaptively controlled IF post-distorter. The adaptively controlled IF post-distorter compensates for the non-linear distortion in both transmitter and receiver sections of the wireless digital communication system.

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

Figure 2:
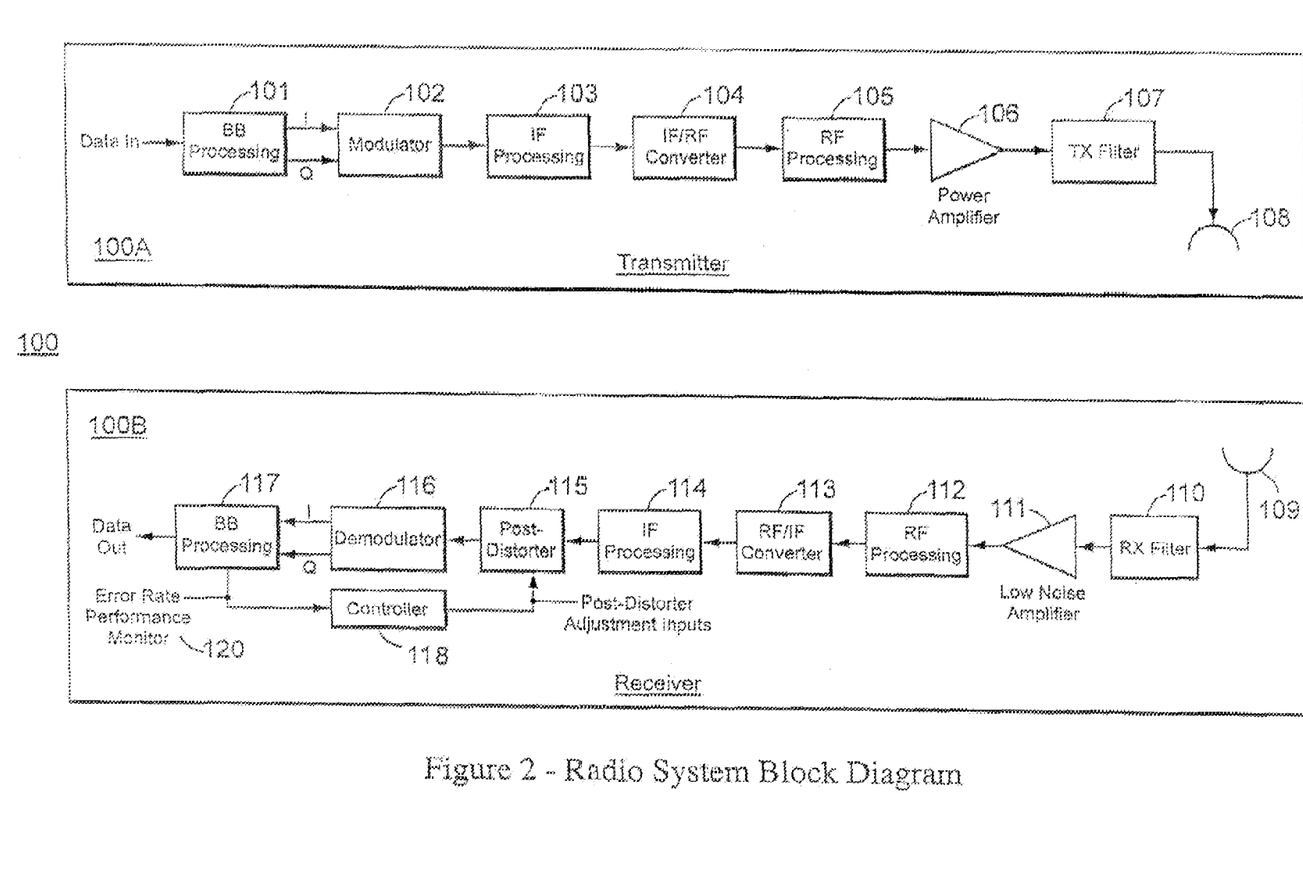
FIG. 2 illustrates a wireless communications system block diagram showing an IF post-distorter in the receiver. The bit error rate performance monitor utilizes a microprocessor to adjust the post-distorter for improved bit error rate performance.

As mentioned, the present invention operates in the context of wireless (radio) digital communications and is embodied, for example, in a wireless digital communications system as shown in FIG. 2. The upper portion of the diagram illustrates a typical heterodyne transmitter in a microwave radio digital communications system 100 using QAM (quadrature amplitude modulation).

For data input signals, the baseband (BB) processing stage 101 provides a number of required signal processing operations to condition the signal to be carried by the radio system 100. Then the quadrature amplitude modulator 102 modulates carriers I (amplitude) and Q (phase) to yield a QAM signal at the intermediate frequency (IF). Assuming that the I and Q carriers are $m_I$ and $m_Q$, respectively, and that the local oscillator (LO) frequency is expressed in the form of $w_c$, the modulated (QAM) IF signal, $S_{IF}$, is expressed as a function of time, t, as follows: $S_{IF}(t) = m_I \cos(w_c t) - m_Q \sin(w_c t)$. The values $m_I$ and $m_Q$, are the cartesian representations of the amplitude and phase of the IF signal.

The IF processing stage 103 provides IF filtering, IF amplification, and cable compensation to overcome the loss of signal due to cable losses between the modulator 102 and power amplifier 106. The IF/RF converter stage 104 converts the modulated IF signal to an RF signal. Then the RF processing stage 105 provides RF amplification to drive up the RF power amplifier.

The RF power amplifier stage 106 raises the power level of the RF signal to the required transmitter signal at the antenna. As suggested before, a RF power amplifier has a non-linear transfer characteristic manifested in terms of a dominant third-order non-linear behavior. This non-linear characteristic causes amplitude-to-amplitude modulation (AM—AM) and amplitude-to-phase modulation (AM–PM) distortions, as well as spectrum spreading. Spectrum spreading causes interference to signals in any adjacent channels and creates impairments that adversely affect communications system performance attributes such as the residual bit error ratio (RBER).

The filter stage 107 reduces the levels of out-of-channel spurious emissions, and the levels of the continuous spectrum generated in the transmitter by the non-linear RF power amplifier. Finally, the transmit Antenna 108 directs the transmit signal to the receiver antenna 109 in a point-to-point or point-to-multipoint link using free space as the propagation medium.

The lower portion of FIG. 2 illustrates the heterodyne receiver 100B with the addition of the IF post-distorter 115 (or simply post-distorter). The receiver antenna 109 has a preferred highly directional transmitter signal reception pattern in order to achieve high antenna gain and interference reduction. The receiver filter stage 110 is configured to block the near-end transmitter signal from reaching the receiver, block the low noise amplifier (LNA, 111) noise at the image frequency, and control the spurious receiver responses. The LNA 111 provides amplification of the received filtered signals and sets the receiver noise figure. The receiver RF processing stage 112 provides an additional filter to block the receiver amplifier noise at the mixer image frequency. This processing stage further provides a portion of automatic gain control (AGC) circuit (not shown) to compensate for the varying receiver signal levels at the receiver antenna 109. Then the RF/IF converter 113 converts the receiver RF signal to a receiver IF signal. The receiver IF processing 114 provides IF amplification, and another portion of the AGC circuit to hold the signal being supplied to the post-distorter at a constant level.

The post-distorter 115 generates distortion signals to compensate for the amplitude and phase distortions of the transmit RF power amplifier 106 and the receiver. More details of the post-distorter 115 will be provided below.

The demodulator 116 shifts the receiver IF signal to baseband signal using a carrier on the receiver signal. Then the receiver Baseband (BB) Processing 117 provides a number of required signal processing operations complementary to those of the transmitter BB processing stage (101) such as decision circuitry (A/D converter), decoding, descrambling, error detection, demultiplexing, timing recovery, and adaptive equalization. The controller 118, typically a microprocessor, with its associated logic circuitry provides processing management functions such as interface, control, alarm, monitoring, switching, and telemetry.

As noted above, conventional techniques employ predistorters in transmitters. Apparently, when a pre-distorter is adjusted to improve transmit spectrum, such adjustment may not necessarily improve the residual bit error rate (RBER) in any significant way. In an adaptive control, the adjustment to improve the RBER of the communications system may in fact produce a worse transmit spectrum, especially in broadband applications (wide signal bandwidth applications). Besides, in some implementations that use pre-distortion there is no feedback in the communications system. It means that such systems are implemented as an open loop in which, to be cancelled, the distortion must be known in advance and it requires calibration.

Accordingly, an advantage of using the post-distorter in the receiver is that the adaptive control maintains the transmit spectrum unabated while improving the RBER significantly. This approach represents a closed-loop system and thus requires no advanced knowledge of the distortion to be cancelled.

The RBER information is inherently available in the receiver (from the bit error rate performance monitor 120) and to be obtained it does not require use of additional circuitry. This information is used to adaptively adjust the distortion cancellation for improved performance. Moreover, a single design of post-distorter can work with virtually any RF frequencies. The adaptation is carried out by optimizing the post-distorter using optimization methods such as random or gradient optimization routines. The controller 118 is used to regularly read the RBER, provide optimization routines, and properly provide for the adjustment of the post-distorter 115. As will be later described the RBER information is used to adjust control voltages.

In general terms, the optimization routines can be described as procedures leading to a goal, i.e., a minimum or in-range value as defined by an objective or acceptance function. In a gradient optimization method, values to be optimized are denoted and the optimization objective is to minimize a squared sum of error functions defined by the goal. The gradient optimization calculates the objective functions repeatedly. More specifically, the gradient of the objective function is calculated by perturbing the optimization variables one at a time and finding the corresponding objective function values. Then a line search is performed in the direction of the negative gradient in order to find a minimum in that direction. At the minimum the gradient is differentiated again and a new search direction is found using the gradient information at the turning point. The iterative process is akin to a root finding algorithm that uses linear approximation in a region of interest to find roots at points where the approximating line crosses the axis. In a random optimization method, the optimization variables are given uniformly distributed values in a min-max range.

Figure 3:
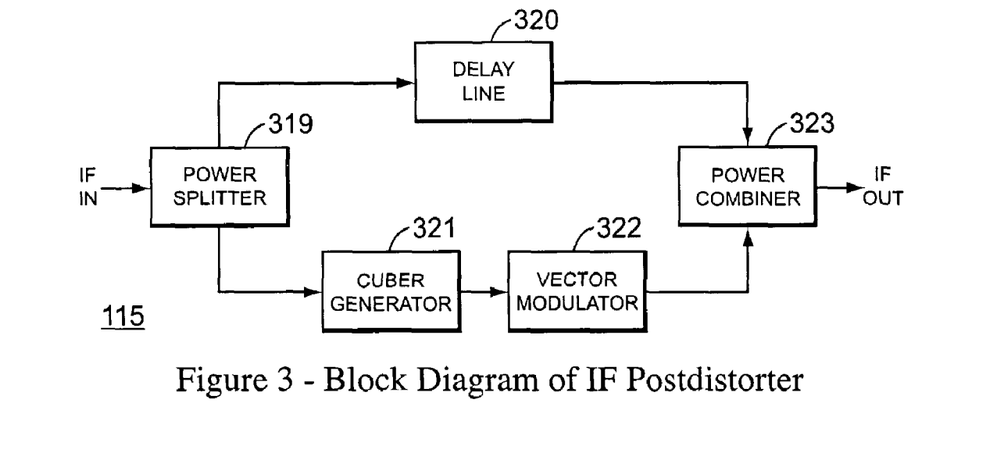
FIG. 3 is a block diagram illustrating the IF post-distorter in more detail.

Returning to the system description, FIG. 3 is a block diagram providing more details of the post-distorter 115. The power splitter 319 divides the input IF signal into two paths: a linear path and a nonlinear path. In the nonlinear path, the cuber generator 321 generates differential output signals that have the same third-order nonlinear characteristics (cuber) of the RF power amplifier. The vector modulator 322 provides the amplitude and phase adjustments of the cubic output signal. The delay line 320 provides the delay in the linear path that is equal to the total delay of the cuber generator and the vector modulator in the nonlinear path. The power combiner 323 then combines the linear and the nonlinear signals.

Figure 4:
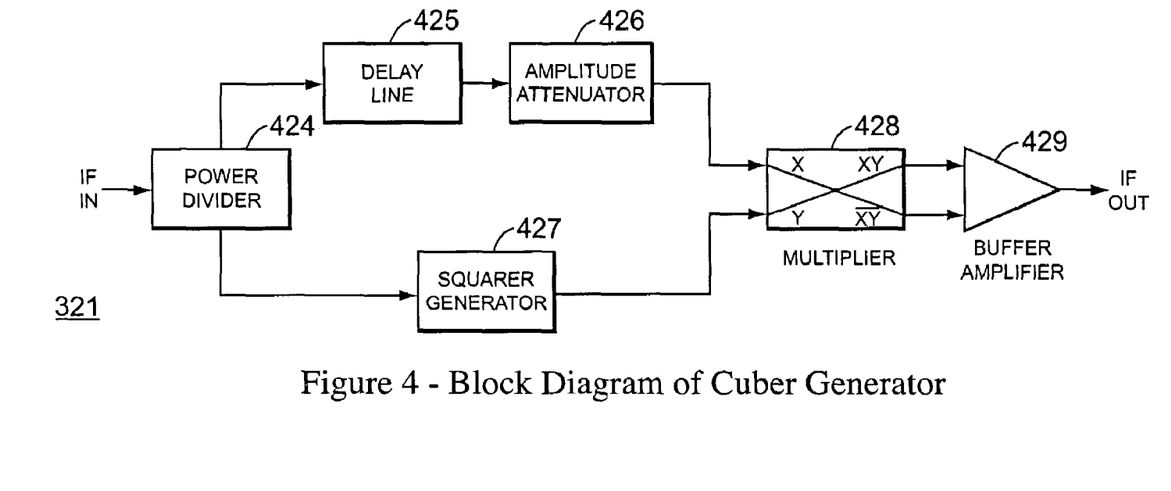
FIG. 4 is a block diagram illustrating a cuber generator that is part of the IF post-distorter.

Next, FIG. 4 is a block diagram providing details of the cuber generator 321. In the cuber generator, the power divider 424 divides the input IF signal into two paths. One path goes to the squarer generator 427 that generates a squaring output signal. The other path goes to delay line 425 and an amplitude attenuator 426. Each of the two paths introduces an associated delay, and the two associated delays are equal to one another. The multiplier 428 multiplies the signals from both paths. Then buffer amplifier 429 amplifies and converts the differential signals from the multiplier 428 into a single-ended output signal that has the cuber characteristics.

Figure 5:
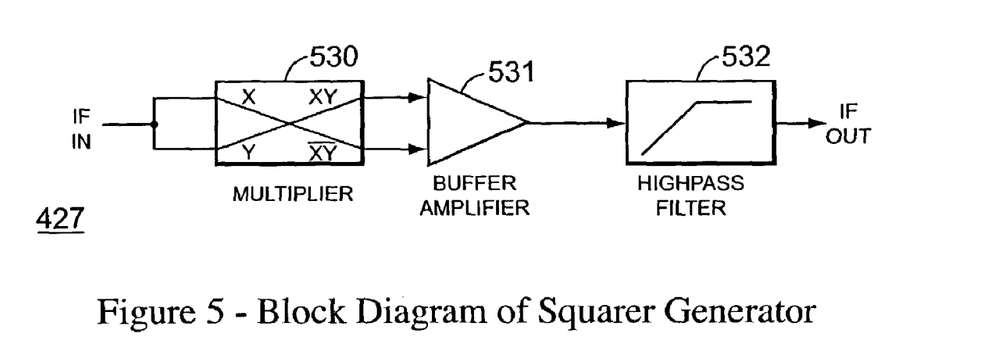
FIG. 5 is a block diagram illustrating a squarer generator that is part of the cuber generator.

As outlined, the cuber generator 321 is configured with a squarer generator 427. FIG. 5 is a block diagram of the squarer generator. The input IF signal goes to the two input ports of the multiplier 530. This multiplier multiplies the two signals (x,y) to generate differential output signals that have the squarer characteristics. The buffer amplifier 531 amplifies and converts the differential signals from the multiplier 530 into a single-ended output IF signal. The high pass filter 532 passes the squarer signal and rejects the low frequency signals resulting from the multiplying process.

The multiplier 530 used in this embodiment is a monolithic, four-quadrant analog multiplier intended for use in high frequency applications with a transconductance bandwidth in excess of very high frequency (VHF) from either of the differential voltage inputs. This type of multiplier is commercially available from different manufacturers. Note that the same multiplier is used in the squarer generator, cuber generator, and vector modulator circuits (427, 321 and 322, respectively).

Other types of multipliers such as high frequency mixer can also be used in place of the four-quadrant analog multiplier but then all the circuit topologies, as described herein, must be changed accordingly. Notwithstanding, the principles of IF post-distorter still apply.

With respect to the squarer generator circuit 427, consider the two sinusoidal input signals $v_1$ and $v_2$ as follows:

$$v_1 = A \cos wt$$

$$v_2 = A \cos wt$$

where A is the amplitude of the signal and $w=2\pi f$, with f being the frequency of the signal. The Multiplier provides a total output voltage $v_s$ given by:

$$v_s = v_1 * v_2 = (A \cos wt)^2$$

$$v_s = A^2 \cos^2 wt \quad (1)$$

From a trigonometric function in the form:

$$\cos 2wt = \cos^2 wt - \sin^2 wt = \cos^2 wt - (1-\cos^2 wt) = 2\cos^2 wt - 1$$

it follows that:

$$\cos^2 wt = \frac{1}{2}(1+\cos 2wt) \quad (2)$$

Then, in view of (2), (1) can be rewritten as follows:

$$v_s = (\tfrac{1}{2}A^2)(1+\cos 2wt) = (\tfrac{1}{2}A^2) + (\tfrac{1}{2}A^2)\cos 2wt \quad (3)$$

The results in equation (3) contain only the second harmonic frequency output. Note that no odd harmonic products are present. The results contains also a DC term that varies strongly with the amplitude A of the input signal. Note that (as can be understood from the block diagram in FIG. 2) $v_1$ and $v_2$ may contain other harmonics. Thus, the above equations can be expanded further to include the other harmonics terms.

With respect to the cuber generator circuit 321, consider the three sinusoidal input signals $v_1$, $v_2$, and $v_3$ as follows:

$$v_1 = A \cos wt$$

$$v_2 = A \cos wt$$

$$v_3 = A \cos wt$$

From these input signals, the multiplier provides a total output signal $v_s$ given by:

$$v_s = v_1 * v_2 * v_3 = (A \cos wt)^3$$

$$v_s = A^3 \cos^3 wt \quad (4)$$

From a trigonometric function in the form:

$$\cos 3wt = 4 \cos^3 wt - 3 \cos wt$$

it follows:

$$\cos^3 wt = \tfrac{1}{4}(\cos 3wt + 3 \cos wt) \quad (5)$$

In view of (5), (4) can be rewritten as follows:

$$v_s = (\tfrac{1}{4}A^3)(3 \cos wt + \cos 3wt)$$

or:

$$v_s = (\tfrac{3}{4}A^3)\cos wt + (\tfrac{1}{4}A^3)\cos 3wt \quad (6)$$

Incidentally, since $v_1$, $v_2$, and $v_3$ may contain other harmonics, the equations can be expanded to include other corresponding terms. Note however that the results represented in equation (6) contain only the fundamental and third-order products (first and third harmonics with w and 3w, respectively) and no fifth-order products and even-harmonic terms are present. This is in contrast to many pre-distorters in traditional techniques using components such as Schottky diodes that generate fifth-order products and create performance problems in the communications system.

Figure 6:
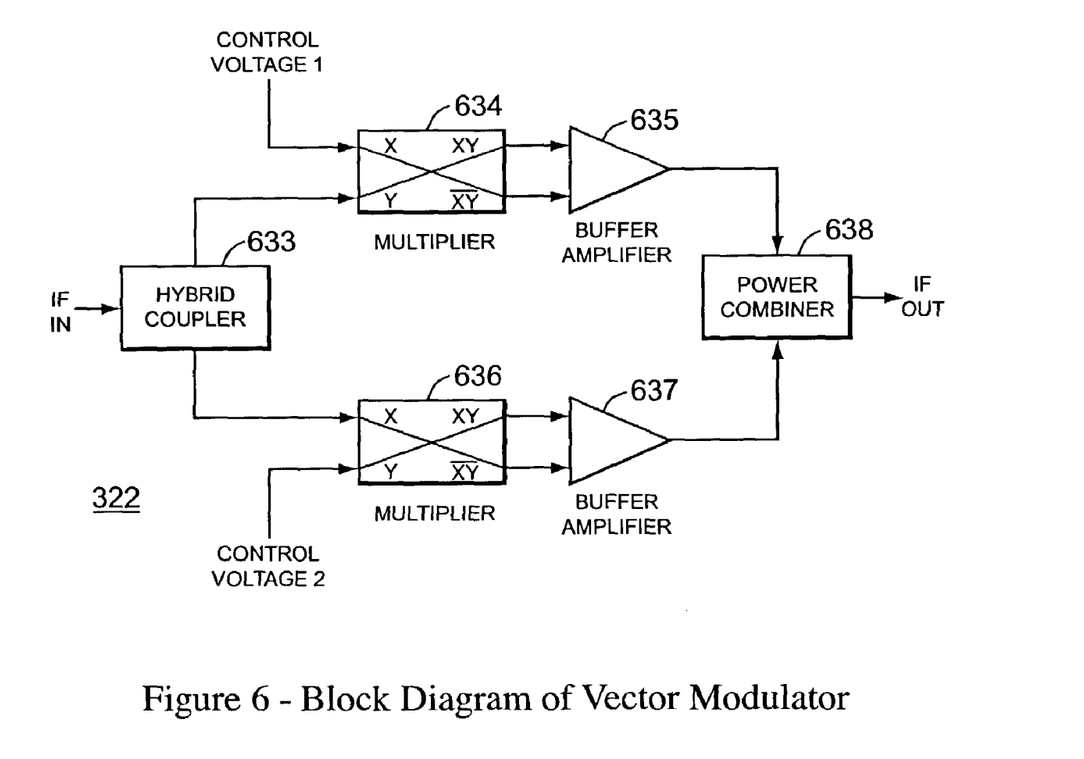
FIG. 6 is a block diagram illustrating a vector modulator that is part of the IF post-distorter.

As outlined above, another component in the IF post-distorter 115 is the vector modulator 322. FIG. 6 is a block diagram of the vector modulator 322. As shown, the quadrature hybrid coupler 633 takes the signal from the cuber generator 321 and provides two output signals equal in amplitude but 90-degree different in phase. A first multiplier 634 multiplies one of these two output signals by a first control voltage (control voltage 1) to produce differential output signals whose magnitudes vary as a function of control voltage 1. The buffer amplifier 635 takes these differential signals, amplifies and converts them into a single-ended output signal. In a similar manner, a second multiplier 636 multiplies the other of the two output signals by a second control voltage (control voltage 2) to produce another pair of differential output signals whose magnitudes vary as a function of control voltage 2. The buffer amplifier 637 takes these differential outputs signals, amplifies and converts them into a second single-ended output signal.

Figure 6A:
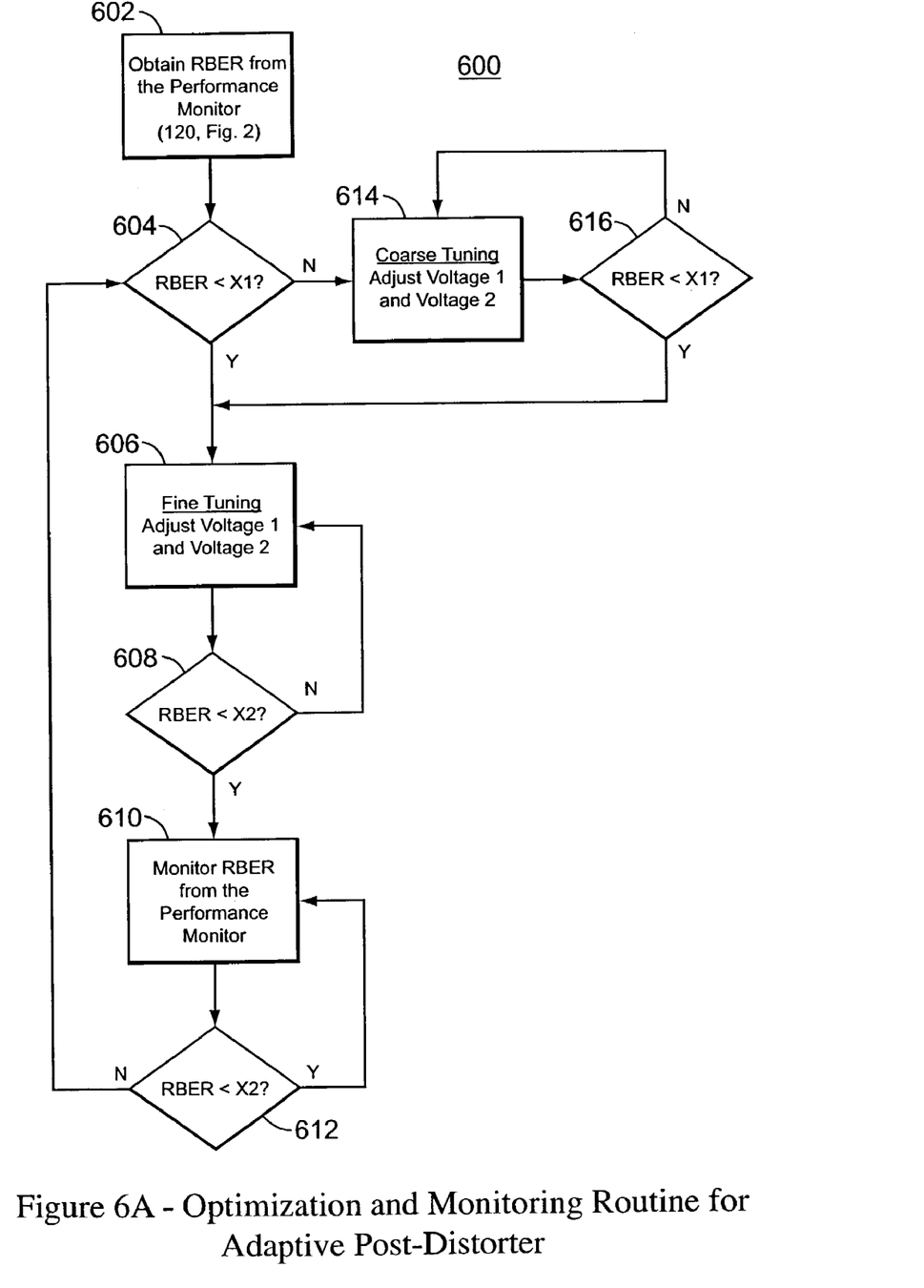
FIG. 6a is a flow diagram illustrating control of the IF post-distorter using bit error rate information.
Figure 7:
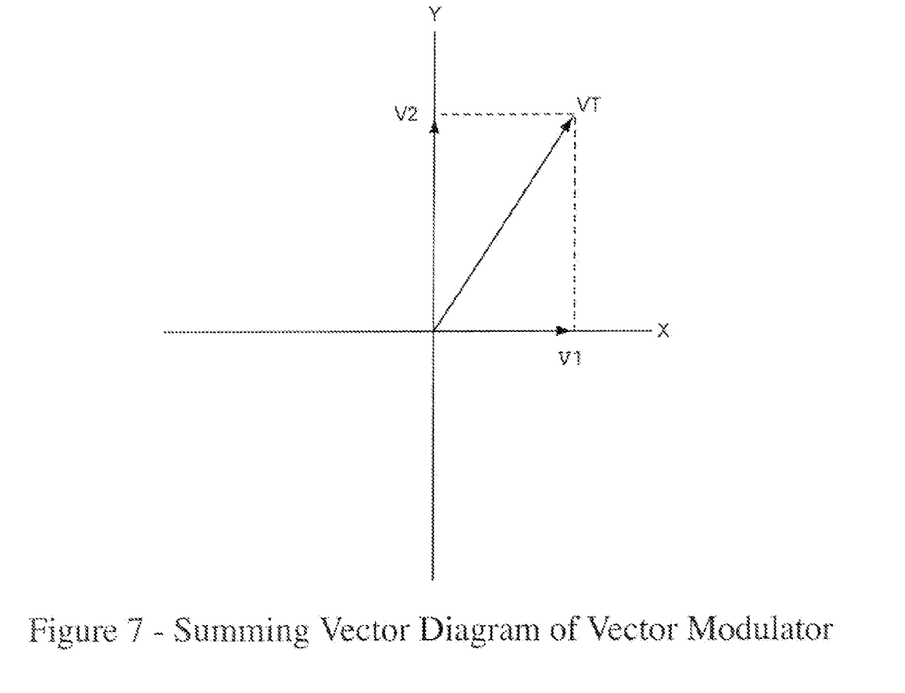
FIG. 7 is a graph illustrating a summing vector diagram of the vector modulator.

As further shown, the power combiner 638 combines the two single-ended signals, and produce a summing signal. FIG. 6A illustrates one way in which the RBER is used to provide the control function. A diagram of the summing signal at the output of the power combiner 638 is provided in FIG. 7. In this diagram, the signals $v_1$ and $v_2$ are two sinusoid signals with a consistent 90 degrees phase shift between them and with respective magnitudes that depend on the control voltage 1 and control voltage 2. Note that it is possible to cover all four quadrants of the diagram since both control voltages can take either positive or negative values. Depending on the voltage levels and signs (negative/positive) of the control voltages 1 & 2, the summing signal amplitude and phase can vary from 0 to 30 dB and 0 to 360 degrees, respectively.

Returning to FIG. 6A, where (in step 602) the RBER is obtained from a performance monitor. The bit error rate performance monitor provides an inclusive error function for the optimization routine. The error function is a single value summarizing distortion from both the transmitter and receiver. When adjustments utilizing random or gradient optimization routines are made to control voltage 1 or control voltage 2, the result can be determined from the error function. Thus, if the error function improves, the control voltages are adjusted. If the error function degrades, the control voltages maintain their original values. During optimization when the error function is large (X1, step 604), a coarse tuning procedure is utilized with the control voltages changing in large increments (steps 614 & 616). When the error function is small (RBER<X1), a fine tuning procedure is utilized with the control voltages changing in small increments (steps 606 & 608). After the error function achieves a predefined value (X2) corresponding to a satisfactory communications system performance level, the routine can change to a monitoring loop (steps 610 & 612). In the monitoring loop, if the error function is better than the defined value, then it remains in the monitoring loop, but if the error function degrades below the defined value, then it returns to the optimization routine (step 604).

With these controls, the post-distorter can produce a distortion signal that has the same magnitude but is out of phase from the combined distortion signals generated by any transmitter and receiver. Moreover, the adaptive post-distorter continues to optimize the wireless communications system performance regardless of variations in transmitter power levels, or temperature and aging of the transmitter and receiver. The control voltages 1 & 2 come from the controller (118, FIG. 2). The controller, using the inherently available RBER information from the receiver, adaptively adjusts the control voltages 1 & 2 to trim down the RBER and optimize for the best performance results. Because of the relatively easy adjustments of the control voltages 1 & 2, the adaptive process does not need any sophisticated optimization process Standard random or gradient optimization routines are adequate for this application.

Since all components used in the post-distorter have wideband response, the post-distorter has broadband performance covering different communications applications with any bandwidth (e.g., from 2 MHz to 60 MHz) and with any capacity (e.g., QPSK to 256-QAM). Also, because the post-distorter operates at a common IF frequency, it can be used with any microwave digital communications systems (e.g., from 2 GHz to greater than 40 GHz). Unlike systems with transmitter pre-distorter or feedforward techniques that operate at the high transmitter RF frequencies, the post-distorter operates at the low receiver IF frequencies and thus can provide efficient reduction of RBER at a much lower cost. Moreover, the nonlinear characteristics of the power amplifiers or receivers do not need to be known in advance of the cancellation process, saving a considerable amount of time in the calibration process.

In summary, the present invention provides an adaptive broadband post-distortion receiver. In this receiver, the adaptively controlled IF post-distorter compensates for the non-linear distortion in both transmitter and receiver sections of the wireless digital communication system. The post-distorter is placed at the IF section of the receiver and it is configured to cancel the distortion using a bit error rate calculation.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A system for distortion compensation embodied in a receiver, comprising:
    a post-distorter;
    a bit error rate source; and
    a controller configured to
        obtain residual bit error rate (RBER) from the bit error rate source, and
        use the RBER in performing an optimization process for adjusting the post-distorter to reduce the RBER.

2. The system as in claim 1, wherein the post-distorter includes
    a power splitter,
    a delay line setting a first path from the power splitter,
    a cuber generator setting a second path from the power splitter,
    a vector modulator connected to the cuber generator along the second path, and
    a power combiner at which the first and second paths converge.

3. The system as in claim 1, wherein the optimization process is a random or gradient optimization process.

4. The system as in claim 1, wherein the receiver is communicatively connected to a transmitter via an antenna, and wherein the post-distorter is configured to affect reduction in the RBER regardless of variations in transmitter power levels, or temperature and aging of the transmitter and receiver.

5. The system as in claim 1, wherein the controller is fashioned as a digital circuit including a microprocessor.

6. The system as in claim 2, wherein the cuber generator includes
    a power divider with two outputs each setting a signal path,
    a delay line on a first one of the signal paths,
    an attenuator connected to the delay line along the first one of the signal paths, a squarer generator on a second one of the signal paths,
a multiplier configured for receiving signals from the signal paths, and
an amplifier connected to outputs of the multiplier.

7. The system as in claim 6, wherein the amplifier is a differential to single-ended amplifier.

8. The system as in claim 6, wherein the squarer generator includes
a corresponding multiplier,
an corresponding amplifier connected to the corresponding multiplier, and
a filter coupled to the corresponding amplifier.

9. The system as in claim 8, wherein the corresponding amplifier is a differential to single-ended amplifier.

10. The system as in claim 8, wherein the filter is a high-pass filter.

11. The system as in claim 2, wherein the vector modulator includes
a coupler with two outputs,
a first multiplier connected to one of the coupler's outputs and receiving a first control voltage the value of which is controlled by the controller,
a second multiplier connected to a second of the coupler's outputs and receiving a second control voltage the value of which is controlled by the controller,
a first amplifier connected to the first multiplier,
a second amplifier connected to the second multiplier, and
a combiner configured to receive signals from the first and second amplifiers.

12. The system as in claim 11, wherein the first and second amplifiers are each a differential to single-ended amplifier.

13. A receiver system for distortion compensation, comprising:
means for providing post-distortion;
means for providing a bit error rate; and
controller means including
means for obtaining residual bit error rates (RBER) from the bit error rate providing means, and
means for using the RBER in performing an optimization process for adjusting the post-distortion means to reduce the RBER.

14. The system for wireless digital communications, comprising:
a transmitter; and
a receiver with a wireless connection to the receiver and with a circuit for adaptive broadband post-distortion, the circuit including
a post distorter placed at an IF (intermediate frequency) stage of the receiver,
a controller,
a demodulator, and
a baseband processor configured for receiving demodulated signal from the demodulator in response to which the baseband processor provides residual bit error (RBER) rate information for the controller, the controller being configured to use the (RBER) information in performing an optimization procedure for adjusting the post-distorter.

15. The system as in claim 14, wherein the receiver further includes
an RF (radio frequency) processing and RF to IF converter circuitry configured to produce an IF signal, and
an IF processing circuitry configured to receive the IF signal and provide a processed IF signal to the post-distorter.

16. The system as in claim 14, wherein the post-distorter has broadband performance and is useable with any microwave digital communication system including one operating in a frequency range from 2 GHz to greater than 40 GHz.

17. The system as in claim 14, wherein the post-distorter is configured for
nonlinear characteristics closely related to those generated by the transmitter and receiver, and
reducing fifth-order products.

18. The system as in claim 14, wherein the optimization procedure is a random or gradient optimization process.

19. The system as in claim 14, wherein the post-distorter is configured to affect reduction in the (RBER) regardless of variations in transmitter power levels, or temperature and aging of the transmitter and receiver.

20. A method for adaptive broadband post-distortion in a receiver system, comprising:
receiving an RF signal from a transmitter;
converting the RF signal into an IF signal and processing the IF signal;
introducing post-distortion into the processed IF signal;
demodulating the post-distorted, processed IF signal to create a baseband signal;
processing the baseband signal;
retrieving a residual bit error rate (REBER) associated with the processed baseband signal; and
performing an optimization process according to which the post-distrotion is adjusted.

21. The method as in claim 20, wherein the optimization process is a random or gradient optimization process.

22. The method as in claim 20, wherein the post-distortion is configured to affect reduction in the RBER regardless of variations in transmitter power levels, or temperature and aging of the transmitter and receiver.

23. The method as in claim 20, wherein the optimization process involves random or gradient optimization routines for adjusting first and second control voltages.

24. The method as in claim 20, wherein the optimization process includes
monitoring, and
adjustment.

25. The method as in claim 24, wherein the monitoring includes determining if the (RBER) changes.

26. The method as in claim 24, wherein the adjustment includes
maintaining control voltage values steady if the RBER degrades,
adjusting the control voltage values if the RBER improves,
wherein when the RBER is larger than a first predetermined value, a coarse tuning procedure is utilized in which the control voltage values are adjusted in large increments, and
wherein when the RBER is smaller than a second predetermined value, a fine tuning procedure is utilized in which the control voltages values are adjusted in small increments.

27. The method as in claim 26, wherein the monitoring includes
entering a monitoring loop when the RBER reaches the second predetermined value, and determining if the RBER changes, and
existing the monitoring loop to resume the adjustment if the RBER exceeds that value.

* * * * *

UNITED STATES PATENT AND TRADEMARK OFFICE
CERTIFICATE OF CORRECTION

| | | |
|---|---|---|
| PATENT NO. | : 7,242,725 B2 | Page 1 of 1 |
| APPLICATION NO. | : 10/406929 | |
| DATED | : July 10, 2007 | |
| INVENTOR(S) | : Frank S. Matsumoto and David C.M. Pham | |

It is certified that error appears in the above-identified patent and that said Letters Patent is hereby corrected as shown below:

Col. 11, Line 43, Claim 14, line 1, before "system" delete "The" and in place thereof insert --A--.

Col. 11, Line 56, Claim 14, line 14, delete "(RBER) rate" and in place thereof insert --rate (RBER)--.

Col. 12, Line 25, Claim 20, line 10, delete "(REBER)" and in place thereof insert --(RBER)--.

Col. 12, Line 43, Claim 25, line 2, delete "(RBER)" and in place thereof insert --RBER--.

Signed and Sealed this

Sixth Day of November, 2007

JON W. DUDAS
*Director of the United States Patent and Trademark Office*